United States Patent [19]

Katsuma

[11] 3,869,261

[45] Mar. 4, 1975

[54] CORROSION-RESISTANT COMPOSITE COATING TO BE FORMED ON STEEL MATERIALS AND METHOD OF FORMING THE SAME

[75] Inventor: Kunio Katsuma, Tokyo, Japan

[73] Assignee: USUI Kokusai Sangyo Kabushiki Kaisha, Sunto-gun, Shizuoka Prefecture, Japan

[22] Filed: May 22, 1974

[21] Appl. No.: 472,132

[52] U.S. Cl. ............... 29/196.3, 29/196, 29/196.4, 29/196.5, 29/196.6, 204/37 T, 204/40
[51] Int. Cl. ....... B23p 3/20, C23b 5/50, C23b 5/52
[58] Field of Search ............... 204/37 R, 37 T, 40; 29/196, 196.2, 196.3, 196.5, 196.6, 196.4

[56] References Cited
UNITED STATES PATENTS

| | | | |
|---|---|---|---|
| 1,970,548 | 8/1934 | Batten et al. | 29/196.3 |
| 2,304,709 | 12/1942 | Rubin | 204/37 T X |
| 2,381,778 | 8/1945 | Schoonmaker et al. | 204/37 T |
| 2,428,318 | 9/1947 | Nachtman | 204/37 T |
| 2,490,700 | 12/1949 | Nachtman | 204/37 T |

*Primary Examiner*—G. L. Kaplan
*Attorney, Agent, or Firm*—James M. Heilman; William O. Heilman; Anthony J. Casella

[57] ABSTRACT

Heretofore, corrosion-resistant coatings on steel materials have been formed as single layers of zinc, lead, tin, copper and so forth or composite layers or alloy layers of these metals, and many improvements have been made in connection with them. However, a coating providing sufficient enough corrosion-resistant property has not yet been known.

The corrosion-resistant composite coating for steel materials according to the invention is obtained by first forming an electroplating layer of zinc as inner layer, an electroplating layer of copper as intermediate layer and an electroplating layer of tin as outer layer and subsequently heat treating the resultant composite layer to form a Cu-Sn alloy layer intervening between the intermediate and outer layers. The composite coating according to the invention can show very excellent corrosion-resistant property.

The corrosion-resistant composite coating according to the invention is obtained under unique electroplating conditions and heating conditions. In the electroplating step for forming the outer layer (tin layer), an electroplating liquid with pH of 1 to 4 is used, and in the heating step due care is taken to hold the outer layer practically at a temperature in the neighborhood of the melting point of tin but not in excess of that melting point.

4 Claims, No Drawings

CORROSION-RESISTANT COMPOSITE COATING TO BE FORMED ON STEEL MATERIALS AND METHOD OF FORMING THE SAME

The present invention relates to improvements in and relating to corrosion-resistant coatings formed on steel materials.

Heretofore, the corrosion-resistant coatings of this kind have been formed as single layers of zinc, lead, tin, copper and so forth or composite layers or alloy layers of these metals. However, the corrosion-resistant property that is obtainable at present is not sufficient enough, and its wide improvement has been desired. The invention has for its object the provision of an excellent corrosion-resistant coating capable of meeting the demand in the industry, and it is another object to obtain uniform coating thickness.

The corrosion-resistant coating according to the invention is a composite coating having a novel structure, and the gist of the invention resides in a corrosion-resistant composite coating for steel materials, which is obtainable by providing the surface of the steel material having or not having a coating layer of a metal nobler than zinc with an electroplating layer of zinc as inner, an electroplating layer of copper as intermediate layer and an electroplating layer of tin as outer layer and then heat treating the resultant composite layer to form an alloy layer of copper and tin intervening between the intermediate and outer layers. The composite coating thus obtained shows utterly unpredictable corrosion-resistant property as will be demonstrated later in connection with examples of the invention. Also, uniform layer thickness is obtainable. Further, pronounced usefulness can be appreciated when the coating is provided on thin steel pipes for in such case union nuts may be fitted on the pipe provided with the corrosion-resistant coating in sealing relation thereto.

In the improvement of the corrosion-resistant property alone is aimed, only the intermediate copper layer may be formed by the electroplating process, with the inner zinc layer and outer tin layer formed by the immersion process, thus dispensing with the fourth step of the heating process. In this case, however, lack of uniformity of the layer thickness inevitably results. Still less is possible in this case to obtain a composite coating of uniform and desired thickness. The desired thickness here is below 25 micron which the maximum thickness of plating.

The method for forming the composite coating according to the invention permits to obtain improved corrosion-resistant property without sacrifice in the uniformity of the layer thickness. Essentially it comprises a first step of electroplating the surface of steel material having or not having a previously formed plating layer of a metal nobler than zinc with zinc, a second step of electroplating the zinc layer formed in the first step with copper, a third step of electroplating the copper layer formed in the second step with tin, and a fourth step of heat treating the resultant composite layer to form an alloy layer intervening between the copper layer (intermediate layer) and tin layer (outer layer), the third step of electroplating with tin being carried out by using an electroplating liquid with pH of 1 to 4, and the fourth step being carried out in a gaseous atmosphere or oil layer at a temperature in the neighborhood of the melting point of tin. The corrosion-resistant composite coating for steel materials according to the invention is obtained by this method.

The zinc electroplating layer that is formed in the first step is formed on the steel material directly thereon if the material is bare. If the steel material surface is previously coated with a metal nobler than zinc, for instance chromium, cadmium, cobalt, nickel, tin, lead and copper, the zinc electroplating may be formed on that coating layer. For example, where a thin steel pipe to be subjected to the corrosion-proof treatment is previously coated with copper, the zinc electroplating layer may be formed without removing the copper layer.

The copper layer formed in the second step is formed by using an alkaline electroplating liquid since the inner zinc layer is weak to acid. Its thickness is above 3 microns, preferably 5 to 8 microns.

The third step of forming a tin layer on the copper layer is carried out by using an electroplating liquid with pH of 1 to 4; because with pH lower then 1 and with copper layer thinner than 3 microns, for instance with pH of 0.8 and with copper layer thickness of 2 microns, this electroplating layer will penetrate the copper layer and attack the inner zinc layer. This fluxing action takes place through pin holes present in the copper layer but invisible with the naked eye. It can however be confirmed with foaming. The foaming tends to be less the greater the thickness of the copper layer, and it does not substantially take place with a thickness of 3 microns. This however applies to the case of carrying out the electroplating with tin in the conconduction state. In case of doing this in the conduction state, the zinc layer on the inner side of the copper layer is attacked to result in the foaming again. The invention is based on the finding that the foaming under the conduction state sharply disappears when the hydrogen ion concentration is made greater than 1, particularly when the hydrogen ion concentration is adjusted to be within 1 and 4. The upper limit of pH is set to 4, because with pH in excess of 4 compounds of tin would tend to settle in the electroplating liquid, leading to increase of power consumption to an industrially infeasible extent with the alkaline bath as is well known in the art. From the above grounds the third step is carried out with an electroplating liquid with pH of 1 to 4.

The thermal treatment in the fourth step is carried out without defroming or denaturing the outer tin layer. With this heat treatment the attacking of the copper layer through the tin layer and the attacking of the zinc layer through the copper layer can be inhibited. The temperature and time of the treatment differ depending upon the shape and size of the steel material or depending upon the type and construction of the heating system, and according to the invention superb results can be obtained by selecting the temperature at be in the neighborhood of the melting point of tin (231 ± 10 degrees Celsius) and determining the time from empirical data. In general, the intended end can be achieved in 5 to 1 minutes under the heating phase, but in this heat treatment care is taken lest the actual temperature of the outer layer will not exceed the melting point of tin. With this heat treatment the corrosion-resistant property is improved presumably because of the formation of an alloy layer between and consisting of the metals of the copper and tin layers, the alloy layer thus formed acting to block communication of pin holes in the tin layer with the copper layer. Although this alloy layer is thicker than the barrier layer, it cannot be usually recognized with a microscope with a magnification factor of the order of 400. While the pin holes in the tin layer which is formed as the outer layer on the copper layer are so small that they cannot be recognized with the ordinary microscope, they can be readily detected with an aquaous solution containing 28 weight percent of $NH_3$ and 5 weight percent of $K_2S_2O_8$ (hereinafter referred to as stabilized aquaous solution of $K_2S_2O_8$). For example, if a composite layer not subjected to the heat treatment is immersed in the stabilized aqueous solution of $K_2S_2O_8$, the copper layer is attacked by that liquid through the pin holes in the tin layer, causing a color change of the liquid into bule color. This color change of the liquid does not take plate where the heat treatment is made. Also, observation of the section along the boundary between the copper layer and tin layer with an electron microscope reveals presence of the afore-said alloy layer in case the coating is heat treated, while no alloy layer is recoginzed before the heat treatment. Further, this alloy layer can be accurately measured with a Kocour thickness meter. The measurement is made by selecting R–47 for the tin layer and R–50 for the alloy layer of copper and tin with respect to the liquid of the Kocour method.

The state of the boundary between the zinc layer (lower layer) and copper layer (intermediate layer) before the heat treatment and that after the heat treatment can be readily distinguished by forming a copper electroplating layer with a thickness of 2 to 3 microns on the zinc electroplating layer, that is, forming a two-layer electroplating coating, and immersing that electroplating layer in an acidic solution with pH not exceeding 1. Without heat treatment foaming of the zinc layer occurs through the pin holes in the copper layer, despite the fact that the pin holes are so small that they cannot be seen with the ordinary microscope, whereas where the heat treatment is made, no such foaming results. This is presumably attributable to the fact that although the barrier layer formed along the boundary between both the layers prior to the heating cannot block intrusion of the acidic solution, through the heating treatment at a temperature in the neighborhood of the melting point of tin a resistance layer not recognizable with the ordinary microscope but having excellent corrosion-resistant property is formed. This is thought to be due to the effect that at a temperature near the melting point of tin copper atoms are diffused into the zinc layer though no substantial merging reaction between zinc and copper takes place. It is known that zinc diffused with a slight quantity of copper is more acid-resistant than zinc in situ.

In the long run, the composite coating according to the invention is thought to exhibit excellent corrosion-resistant property due to the facts that the zinc inner layer is more base than the steel material, the copper intermediate layer is strong against acid, the tin outer layer is strong against the atmosphere and that a corrosion-resistant structure is formed through the heat treatment and also, although not so clear, due to electric corrosion-resistant interactions among the individual layers.

While the corrosion-resistant property of the composite coating according to the invention is thought to be imparted due to the afore-mentioned factors, in practice very excellent corrosion-resistant property utterly unpredictable from such factors can be obtained, and this fact will be shown in connection with specific examples below.

Table 1 shows the results of tests made on the corrosion-resistant composite coating according to the invention, while Table 2 shows the corrosion-resistant property of steel materials provided with sole zinc, copper and tin electroplating coatings, Table 3 shows that of steel materials provided with three-layer electroplating coating not heat treated, Table 4 shows effects of heat treatment of two-layer electroplating coating consisting of a zinc inner layer and a copper outer layer, and Table 5 shows effects of heat treatment of two-layer electroplating coating consisting of a copper inner layer and a tin outer layer. It will be seen that the corrosion-resistant property obtained according to the invention as shown in Table 1 is far superior to and not based on the comparison properties shown in the other Tables.

TABLE 1

Results of tests on steel pipe of Example 1 (coated with three-layer composite electroplating coating subjected to heat treatment with the inner zinc layer having a thickness of 8 microns, the intermediate copper layer having a thickness of 6 microns and the outer tin layer having a thickness of 6 microns)

| Time (hr.) | 100 | 200 | 300 | 500 | 800 | 1300 | 1800 | 2300 |
|---|---|---|---|---|---|---|---|---|
| Results | 2 w | 4 w | 7 w | 19 w | All ⅓ w | All ½ w | All ⅔ w | All w |

Note a) The above thickness values are measured prior to the heat treatment.
b) For the test method and procedure of recording the test results refer to Item (g) in the Example 1. Each record represents the average for three coated steel pipes with a length of 200 millimeters.

TABLE 2

Results of tests on steel pipes of comparison samples coated with a single layer of electroplating coating (with sample 1 coated with a zinc layer 10 microns in thickness, sample 2 coated with a copper layer 10 microns in thickness and sample 3 coated with a tin layer 10 microns in thickness)

| Time (hr.) | 100 | 200 | 300 | 500 | 800 | 1300 | 1800 |
|---|---|---|---|---|---|---|---|
| Sample 1 | All ⅓ w | All ⅔ w | All w | IR | IRR | All ⅔ RR | All ¾ RR |
| Sample 2 | 6R | All ⅓ RR | All ½ RR | All ⅔ RR | All ¾ RR | All RR | |
| Sample 3 | 5R | All ⅓ RR | All ⅓ RR | All ⅔ RR | All 3/5 RR | All 4/5 RR | All RR |

Note a) The above thickness values are measured prior to the heat treatment.
b) For the test method and procedure of recording the test results the same as in note (b) in Table 1 applies.

TABLE 3

Results of tests on steel pipe coated with three-layer electroplating coating not subjected to heat treatment, with the inner zinc layer having a thickness of 8 microns, the intermediate copper layer having a thickness of 6 microns and the outer tin layer having a thickness of 6 microns

| Time (hr.) | 100 | 200 | 300 | 500 | 800 | 1300 | 1800 | 2300 |
|---|---|---|---|---|---|---|---|---|
| Results | 5 w | 4 B | 4 B | R | All ⅓ RR | All ⅔ RR | All ⅔ RR | All ⅔ RR |

Note a) For the test method and procedure of recording the test results the same as in note (b) in Table 1 applies.

TABLE 4

Results of tests on steel pipes coated with a two-layer electroplating coating consisting of an inner zinc layer 8 microns in thickness and an outer copper layer 6 microns in thickness (with sample 5 not subjected to the heat treatment and sample 5′ subjected to the heat treatment)

| Time (hr.) | 100 | 200 | 300 | 500 | 800 | 1300 | 1800 |
|---|---|---|---|---|---|---|---|
| Sample 5 | 1 w | All ⅔ w | All B | 5R | All ⅓ RR | All ⅔ RR | All RR |
| Sample 5′ | 1 w | All ⅓ w | All ⅔ B | All B | 1 R | All ⅓ RR | All ⅔ RR |

Note a) The above thickness values are measured prior to the heat treatment.
b) For the test method and procdure of recording the test results the same as in note (b) in Table 1 applies.

TABLE 5

Results of tests on steel pipes coated with a two-layer electroplating coating consisting of an inner copper layer 6 microns in thickness and an outer tin layer 6 microns in thickness (with sample 6 not subjected to the heat treatment and sample 6′ subjected to the heat treatment)

| Time (hr.) | 100 | 200 | 300 | 500 | 800 | 1300 | 1800 |
|---|---|---|---|---|---|---|---|
| Sample 6 | 3R | All ⅔ RR | All 3/5 RR | All RR | | | |
| Sample 6′ | None | All ⅓ R | All ¼ RR | All ⅔ RR | All RR | | |

Note a) The above thickness values are measured prior to the heat treatment.
b) For the test method and procedure of recording the test results the same as in note (b) in Table 1 applies.

EXAMPLE 1 a. Sample steel material:

A soft steel pipe with an outer diameter of 10 millimeters, a wall thickness of 0.71 millimeter and length of 1,800 millimeters was used as the sample steel material.

b. Electroplating process for forming the zinc layer (lower layer):

The above soft steel pipe was coated with zinc electroplating layer 8 microns in thickness in the usual way.

The electroplating was carried out by using an electroplating liquid having a composition consisting of 256 grams per litre of zinc sulfate, 11.2 grams per litre of aluminum chloride and 75 grams per litre of sodium sulfate and with pH of 4.5, with the liquid agitated by an impeller and held at a temperature of 50°C, and passing cathode current at a density of 50 A/dm² for 37 seconds.

c. Electroplating process for forming the copper layer (intermediate layer):

The steel pipe coated with the zinc electroplating layer obtained in the above process was immersed for several seconds in the aquaous solution containing 2 percent of nitric acid to activate the surface, and then a copper electroplating layer 6 microns in thickness was formed on the activated surface.

The electroplating here was carried out by using an electroplating liquid having a composition consisting of 120 grams per litre of copper cyanide, 130 grams per litre of sodium cyanide and 25 grams per litre of caustic soda and with pH of 12.5, with the liquid agitated by an impeller and held at a temperature of 55°C, and passing cathode current at a density of 8 A/dm² for 140 seconds.

d. Electroplating process for forming the tin layer (outer layer):

The steel pipe coated with the two-layer plating consisting or zinc and copper layers in the previous step was similarly immersed for several seconds in an aquaous solution containing 2 percent of nitric acid to activate the surface of the copper layer, and then a tin electroplating layer 6 microns in thickness was formed on the activated surface.

The electroplating here was carried out by using an electroplating liquid containing 42.5 grams per litre of tin sulfate and with pH of 1.0, with the liquid agitated by an impeller and held at a temperature of 23°C, and passing cathode current at a density of 15 A/dm² for 50 seconds.

e. Thermal treatment:

The steel pipe coated with the three-layer electroplating coating consisting of the zinc layer, copper intermediate layer and tin outer layer obtained through the preceding steps was passed at a speed of 2 millimeters per second through an electric furnace with the inner atmospheric temperature thereof held at 288°C, thereby obtaining the intended uniform corrosion-resistant composite coating.

The coating thickness measured after the heat treatment was 18 microns, which was less than the initial thickness of 20 microns by about 2 microns. The resultant tin layer was 1.15 microns thick, tin-copper alloy layer was 11.68 microns thick, zinc layer was 5.17 microns thick, and zinc-copper alloy layer was too thin to observe with the ordinary microscope.

f. Test results:

The results of tests of the corrosion-resistant property of the coated steel pipe obtained through the above individual steps were very excellent as in the previous Table 1, too superior to be predictable from the results of tests on the comparison samples in Tables 2 to 5.

Also, since the composite coating according to the invention is obtained through the above composite electroplating, the plating layer is uniform without any local irregular thickness portion stemming from sagging or other factors.

g. Method of testing the corrosion-resistant property and procedure of recording the test results The test of the corrosion-resistant property was made on three coated steel pipes each 200 millimeters long as one set by the method specified in ASIM-B117 (JIS Z-2371). The tests were recorded by the following marks.

W: Fine white matters
B: Black spots
R: Red rust spots

| Time (hr.) | 100 | 200 |
|---|---|---|
| Results | 1w | 4w |

RR: Streaky red rust spots

Numerals prefixed to these marks denote number of occurrence. "Many" denotes many occurrence, "All" denotes the entire surface area, and so on.

For instance, "All W" indicates a state in which the entire surface of coating is covered by fine white matters, and "All ½ RR" indicates a state in which a half of the surface is covered by streaky red rust spots. These matters appear in the order of W, B, R, and RR, but the only observation at the time of taking records is shown in the tables. For example, when B and R was observed at said time, only R is shown in the table. The numbers attached to these marks are all average for three pipes in each sample.

EXAMPLE 2 a. Sample steel material:

A soft steel pipe previously coated with a copper electroplating layer 3 microns thick and having an outer diameter of 10 millimeters, a wall thickness of 0.71 millimeters and a length of 1,800 millimeters was used as the sample steel material.

b. Electroplating process for forming the zinc layer (lower layer):

The same as in Example 1.

c. Electroplating process for forming the copper layer (intermediate layer):

The same as in Example 1.

d. Electroplating process for forming the tin layer (outer layer):

The same as in Example 1.

e. Thermal treatment:

The steel pipe coated with the three-layer electroplating coating (the three layers not including the previously coated electroplating copper layer) was immersed in silicone oil heated to 240°C and taken out after 120 seconds, whereby a copper-tin alloy layer with a thickness of 11.62 microns was measured at the boundary between the intermediate and outer layers, while measuring a superficial tin layer thickness of 1.20 microns.

f. Test results:

Through tests in the manner as in Example 1 results as shown in Table 6 below were obtained. These results are practically the same as those in Table 1 (for Example 1) except for slight difference in the initial stage.

TABLE 6

Results of tests on steel pipe of Example 2 (coated with three-layer composite coating subjected to heat treatment, with the inner zinc layer having a thickness of 8 microns, the intermediate copper layer having a thickness of 6 microns and the outer tin layer having a thickness of 6 microns)

| Time (hr.) | 300 | 500 | 800 | 1300 | 1800 | 2300 |
|---|---|---|---|---|---|---|
| Results | 7w | 19w | All ⅓ w | All ½ w | All ⅔ w | All w |

What is claimed is:

1. An article comprising a steel base and a corrosion-resistant coating thereon, said coating having been obtained by forming a three-layer structure on the steel material surface, said structure consisting of a zinc electroplating inner layer, a copper electroplating intermediate layer and then a tin electroplating outer layer, and forming a copper-tin alloy layer between the intermediate and outer layers through heat treatment of said three-layer structure.

2. The article according to claim 1, which has formed on said steel base between said steel and zinc layer a previously formed coating layer of a metal nobler than zinc.

3. A method of forming a corrosion-resistant composite coating on a steel material comprising a first step of electroplating the surface of the steel material with zinc, a second step of forming a copper electroplating layer on the zinc layer formed in the first step, a third step of forming a tin electroplating layer on the copper layer formed in the second step, and a fourth step of heat treating the composite layer structure obtained through the first to third steps to obtain an alloy layer intervening between the intermediate copper layer and outer tin layer, the thickness of the copper electroplating layer formed in the second step being set to be 3 microns or greater, the heat treatment in the fourth step being carried out in a gaseous phase or in an oil layer at a temperature around the melting point of tin and by arranging such that the actual temperature of the outer layer does not exceed the melting point of tin.

4. The method of forming a corrosion-resistant composite coating on a steel material according to claim 3, wherein the electroplating with zinc in the first step is made on a previous coating layer formed on the surface of the steel material with a metal nobler than zinc.

* * * * *